(12) United States Patent
Cao et al.

(10) Patent No.: US 11,501,216 B2
(45) Date of Patent: Nov. 15, 2022

(54) COMPUTER SYSTEM, A COMPUTER DEVICE AND A COMPUTER IMPLEMENTED METHOD

(71) Applicant: KING.COM LIMITED, St. Julians (MT)

(72) Inventors: Lele Cao, Stockholm (SE); Sahar Asadi, Stockholm (SE)

(73) Assignee: KING.COM LTD., St. Julians (MT)

(*) Notice: Subject to any disclaimer, the term of this patent is extended or adjusted under 35 U.S.C. 154(b) by 196 days.

(21) Appl. No.: 16/797,023

(22) Filed: Feb. 21, 2020

(65) Prior Publication Data

US 2021/0264319 A1 Aug. 26, 2021

(51) Int. Cl.
*G06N 20/20* (2019.01)
*A63F 13/533* (2014.01)
*G06F 3/0482* (2013.01)
*G06F 17/18* (2006.01)

(52) U.S. Cl.
CPC ............ *G06N 20/20* (2019.01); *A63F 13/533* (2014.09); *G06F 3/0482* (2013.01); *G06F 17/18* (2013.01)

(58) Field of Classification Search
CPC ........ A63F 13/533; A63F 13/47; A63F 13/67; G06F 3/0482; G06F 17/18; G06N 20/20
USPC ......................................................... 706/12
See application file for complete search history.

(56) References Cited

U.S. PATENT DOCUMENTS

| | | | | |
|---|---|---|---|---|
| 10,343,067 B2* | 7/2019 | Reillo | ................... | A63F 13/533 |
| 10,467,327 B1* | 11/2019 | Arazi | ...................... | G06F 17/18 |
| 10,552,002 B1* | 2/2020 | Maclean | ................ | G06N 20/00 |
| 10,594,757 B1* | 3/2020 | Shevchenko | ........ | G06F 40/186 |
| 10,628,834 B1* | 4/2020 | Agarwal | ............ | G06Q 30/0185 |
| 10,963,812 B1* | 3/2021 | Varadarajan | ............ | G06N 5/04 |
| 11,138,514 B2* | 10/2021 | Hu | ......................... | G06N 20/00 |
| 2008/0103996 A1* | 5/2008 | Forman | ................. | G06N 20/00 706/12 |
| 2016/0292248 A1* | 10/2016 | Garcia | ................ | G06Q 10/067 |
| 2017/0352048 A1* | 12/2017 | Richardson | ........ | G06Q 30/0203 |
| 2018/0253759 A1* | 9/2018 | Deng | .................. | G06Q 10/067 |
| 2018/0268296 A1* | 9/2018 | Zheng | .................... | G06N 3/082 |
| 2019/0304067 A1* | 10/2019 | Vogels | .................... | G06F 17/18 |
| 2019/0340579 A1* | 11/2019 | Krystek | ................. | G06N 7/005 |
| 2021/0264319 A1* | 8/2021 | Cao | ........................ | G06F 3/0482 |

* cited by examiner

*Primary Examiner* — William D Titcomb
(74) *Attorney, Agent, or Firm* — Saul Ewing Arnstein & Lehr LLP

(57) ABSTRACT

A computer system has a first machine learning module configured to predict a probability of a respective option being selected by a particular user if presented to that user via a computer app. A second machine learning module is configured to determine a respective confidence value associated with the probability. A third module uses the predicted probabilities and confidence values to determine at least one option to be presented to the particular user.

24 Claims, 12 Drawing Sheets

COMPUTER SYSTEM, A COMPUTER DEVICE AND A COMPUTER IMPLEMENTED METHOD

FIELD OF THE INVENTION

The present disclosure relates to a computer implemented method, a computer device and a computer system and in particular but not exclusively to a computer implemented method, a computer device and a computer system configured to determine one or more options to be presented to a user via a computer app.

Some embodiments may relate to engaging users in a computer app, for example in an online environment.

BACKGROUND OF THE INVENTION

The advent of the internet, and other wide area networks, has led to a proliferation of connected user or client devices, typically running services and associated installations from providers of the user's choice. Such installations may be referred to as apps. There are many different examples of apps such as gaming apps, social apps, entertainment apps, music apps, navigation apps, health apps and many other types of apps.

Apps may be installed on a computing device such as a laptop device, a smart phone or tablet. A user of the computing device interacts with the app.

One technical challenge relates to the scenario where one or more options can be presented to a given user at a given point in an app. There are technical challenges in presenting the option which would be appropriate for the given user at that point in the app.

Another significant challenge is that of user engagement. In particular, the app needs to engage a user of the app while the user is interacting with the app.

This patent specification describes not only various ideas and functions, but also their creative expression. A portion of the disclosure of this patent document therefore contains material to which a claim for copyright is made and notice is hereby given: Copyright King.com Limited 2020 (pursuant to 17 U.S.C. 401). A claim to copyright protection is made to all screen shots, icons, look and feel and all other protectable expression associated with the games illustrated and described in this patent specification.

SUMMARY OF THE INVENTION

According to an aspect, there is provided a computer system comprising: a first machine learning module configured to predict for a plurality of different options which are available to be presented to a user via a computer app, a probability of a respective option being selected by a particular user if presented to that user via the computer app; a second machine learning module configured to determine for the plurality of different options a respective confidence value associated with a probability that the respective option has been previously presented to the particular user via the computer app; and a computer implemented module configured to determine at least one of the plurality of options to be presented to the particular user via the computer app, the determining using one of more of the predicted probabilities and one or more of the respective confidence values associated with a respective option to determine the at least one option to be presented to the particular user.

In some embodiments, the computer system comprises one or more servers.

In some embodiments, the computer system comprises one or more computer or user devices.

In some embodiments, the computer system may comprise one or more servers and one or more computer or user devices.

The computer app may be installed on a computer or user device.

The computer implemented module may be configured to provide the determined at least one option to the particular user via the computer app.

The at least one option may be displayed on a display. The display may be a display of a computer or user device.

The computer app may be provided on a computer device.

The computer system may have a transmitter configured to transmit at least one message to the computer device.

The at least one message may comprise information about the determined at least one option to be provided to the particular user via the computer app.

The first machine learning module may be configured to perform a sample balancing for at least one option to adjust a ratio of positive samples to negative samples for that option, and to use the adjusted positive and negative samples for that option to determine the probability for that option.

The first machine learning module may be configured to perform a sample balancing for each of the options.

The second machine learning module may be configured to perform sample balancing for at least one option to adjust a ratio of samples of a respective option with respect to the samples of at least one other option and to use those adjusted samples to determine the confidence value for the respective option.

The second machine learning module may be configured to perform sample balancing for each of the options.

The computer implemented module may be configured to determine if the selected one of the plurality of options to be presented to the particular user via the computer app is to be selected based on one of more of the predicted probabilities and one or more of the respective confidence values or in dependence on one or more criteria.

The one or more criteria comprises an exploration criteria.

The computer implemented module may be configured to determine if the selected one of the plurality of options to be presented to the particular user via the computer app is to be selected based on one of more of the predicted probabilities and one or more of the respective confidence values or using a heuristic method.

The computer implemented module may be configured to determine that at least one of: one of more of the predicted probabilities; and one or more of the respective confidence values, is below one or more thresholds and use the heuristic method to select the one or more of the plurality of options to be presented to the particular user via the computer app.

The computer implemented module may be configured to determine based on amount of available data for one or more options that a heuristic method is to be used to select the one or more of the plurality of options to be presented to the particular user via the computer app.

The computer implemented module may be configured to adjust a probability of one or more options based on a respective threshold value for that respective option determined using precision-recall information.

The computer implemented module may be configured to adjust a confidence value for one or more options based on a respective threshold value for that respective option determined using recall information.

The computer system may comprise a processing module configured to process one or more categorical data, numeric data and time series data to provide an output, the output being provided as an input to one or more of the first and second machine learning modules.

The processing module may comprise a third machine learning module, the third machine learning module configured to receive the time series data information and to perform convolutional encoding.

The processing module may comprise a fourth machine learning module, the fourth machine learning module configured to receive one or more of categorical data information and numeric data information and to perform denoising encoding.

According to another aspect, there is provided a computer implemented method comprising: predicting, using a first machine learning module, for a plurality of different options which are available to be presented to a user via a computer app, a probability of a respective option being selected by a particular user if presented to that user via the computer app; determining, using a second machine learning module, for the plurality of different options a respective confidence value associated with a probability that the respective option has been previously presented to the particular user via the computer app; and determining, using a computer implemented module, at least one of the plurality of options to be presented to the particular user via the computer app, the determining using one of more of the predicted probabilities and one or more of the respective confidence values associated with a respective option to determine the at least one option to be presented to the particular user.

The predicting, using the first machine learning module, may comprise performing a sample balancing for at least one option to adjust a ratio of positive samples to negative samples for that option, and using, by the first machine learning module, the adjusted positive and negative samples for that option to determine the probability for that option.

The predicting, using the first machine learning module may comprise performing a sample balancing for each of the options.

The determining, using the second machine learning module, may comprise performing sample balancing for at least one option to adjust a ratio of samples of a respective option with respect to the samples of at least one other option and using, by the second machine learning module, those adjusted samples to determine the confidence value for the respective option.

The determining, using the second machine learning module, may comprise performing a sample balancing for each of the options.

The selecting, using the computer implemented module, may comprise determining if the selected one of the plurality of options to be presented to the particular user via the computer app is to be selected based on one of more of the predicted probabilities and one or more of the respective confidence values or in dependence on one or more criteria.

The one or more criteria may comprise an exploration criteria.

The selecting, using the computer implemented module, may comprise determining if the selected one of the plurality of options to be presented to the particular user via the computer app is to be selected based on one of more of the predicted probabilities and one or more of the respective confidence values or using a heuristic method.

The selecting, using the computer implemented module, may comprise determining that at least one of: one of more of the predicted probabilities; and one or more of the respective confidence values, is below one or more thresholds and using by the computer implemented module the heuristic method to select the one or more of the plurality of options to be presented to the particular user via the computer app.

The selecting, using the computer implemented module, may comprise determining based on amount of available data that a heuristic method is to be used to select the one or more of the plurality of options to be presented to the particular user via the computer app.

The selecting may comprise adjusting a probability for at least one option based on a respective threshold value for that respective option determined using precision and recall information.

The selecting may comprise adjusting a confidence value for at least one option based on a respective threshold value for that respective option determined using recall information.

The method may comprise processing, using a processing module, one or more categorical data, numeric data and time series data to provide an output, the output being provided as an input to one or more of the first and second machine learning modules.

The method may comprise receiving, by a third machine learning module of the processing module, time series data information and performing convolutional encoding.

The method may comprise receiving, by a fourth machine learning module of the processing module, one or more of categorical data information and numeric data information and performing denoising encoding.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

Reference will now be made by way of example only to the accompanying drawings in which.

DETAILED DESCRIPTION OF THE INVENTION

In the following description of various embodiment, reference is made to the accompanying drawings which form part thereof, and in which is shown by way of illustration various implementations in which some embodiments may be utilized. It is to be understood that the other implementations may be utilized, and structural and functional modifications may be made without departing form the scope of the present invention.

In the following embodiments, reference is made to a computer game app. It should be appreciated that this is by way of example and other embodiments may be used with any other suitable app. The app may be a health app, a content (such as music or video) providing app, a digital book app, a shopping app, a travel related app, a social media app, a news app, a sporting app or any other suitable app.

Some embodiments may be used in any computer implemented app where there are a plurality of different options which may be presented to a user at a given point. This may be dependent one or more trigger conditions.

Some embodiments may be used in any computer implemented app where there are a plurality of different options which may be presented to a user at a given point which are associated with a different value. This may be dependent one or more trigger conditions.

Figure 1:
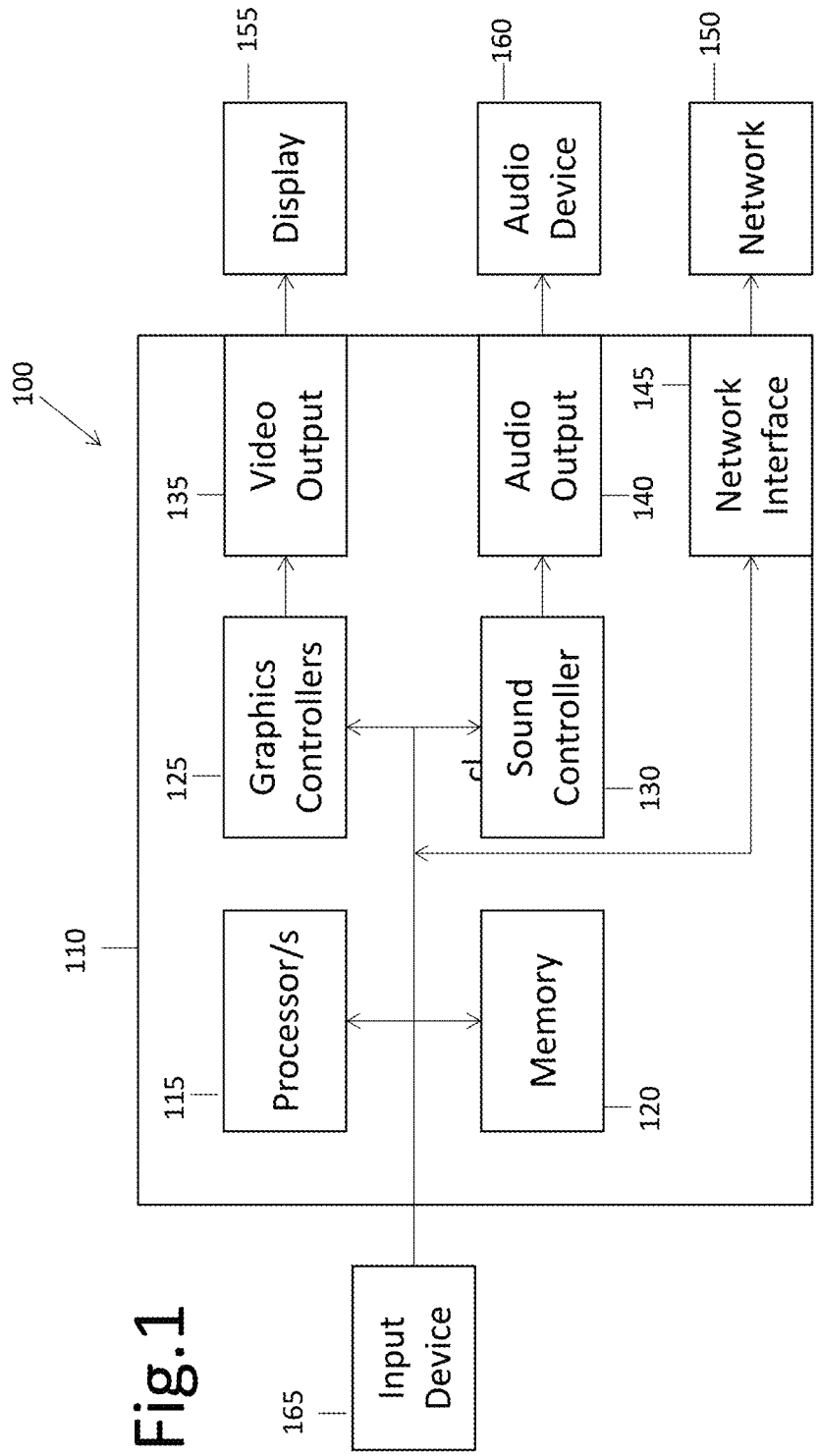
FIG. 1 shows a schematic view of a user device.

A schematic view of a user device 100 according to an embodiment is shown in FIG. 1. All of the blocks shown are implemented by suitable circuitry. The blocks may be implemented in hardware and/or software. The user device may have a control part 110 which may be provided by one or more processors 115 and at least one memory 120. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
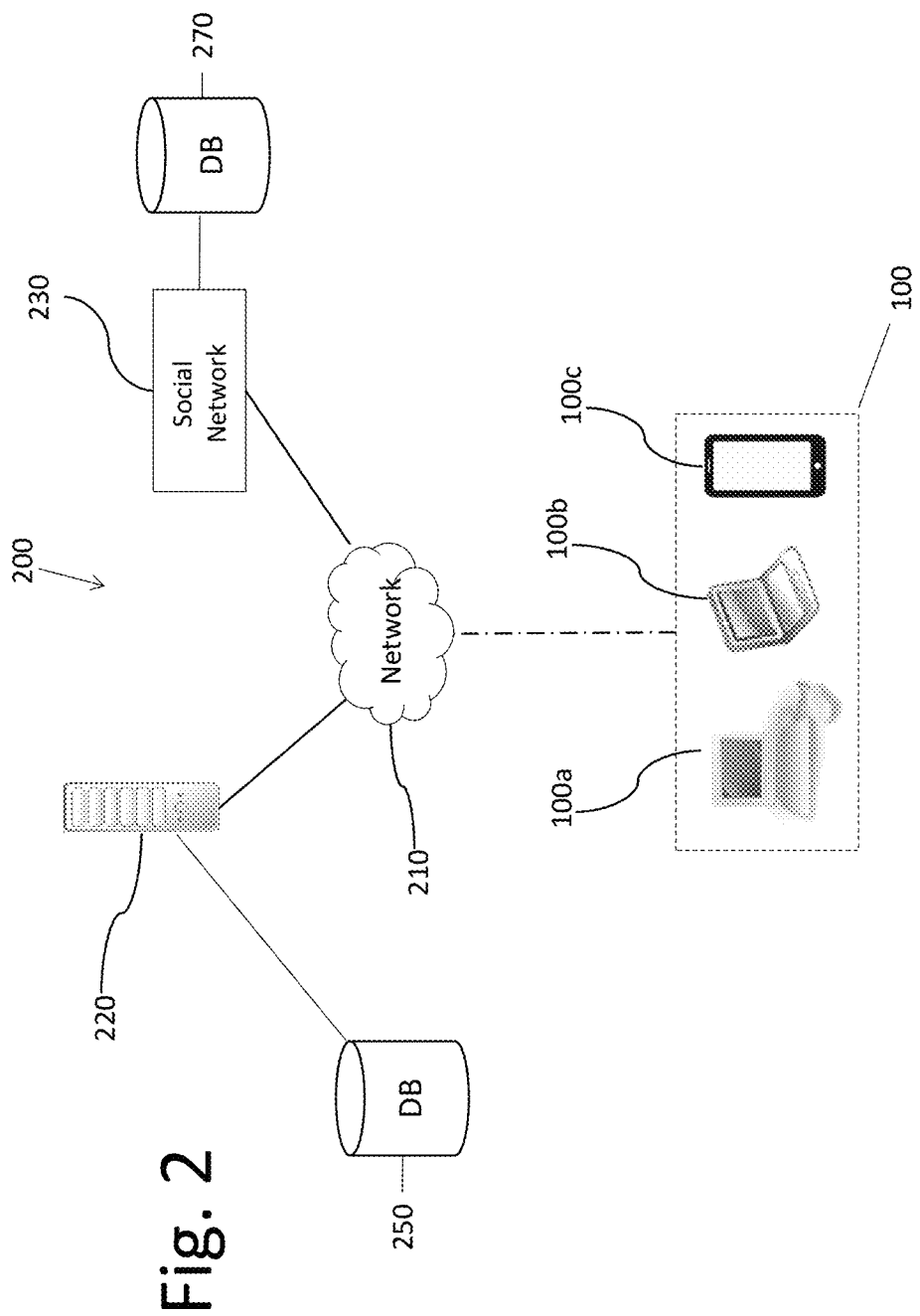
FIG. 2 shows an example computer environment.

FIG. 2 schematically shows a system 200 according to an embodiment. The system 200 comprises a server 220 which may store or be in communication with database 250 which may store game player's details, profiles, statistics etc. In practice, one or more databases 250 may be provided. One or more servers may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet 210 to one or more client or user devices 100, shown in FIG. 2 by way of example as user devices 100a, 100b and 100c, and may further provide connections to one or more servers of a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. It should be appreciated, however, that such an approach does not necessarily require the use of the Internet. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance and/or or to game information related to a social network to which the game is connected. This data may be gathered, stored and used such as discussed below.

Some embodiments relate to which one of a plurality of different available options are presented to the user at a given point. In some embodiments, the option may be one which the user can chose to select or not. In some embodiments, the option may be one which is selected and provided to the user but the user may not engage with the option either completely or partly or may even stop interacting with the app for at least some time.

In the example of a gaming, some embodiments may determine at a given point of the game what option to present to the user. This may be dependent on one or more trigger conditions being met. The trigger condition may be related to the interaction of the user with the game, game progress of the user, a time related condition and/or any other suitable condition.

Purely by way of example, the options may be to determine which "live op" is to be presented to user at a particular point in a game. In some embodiments, a live op may be a time limited event. The live op may only be provided for a limited amount of time. Alternatively or additionally the live op may only be available within a limited time frame.

In some embodiments, different types of live op may be available and some embodiments may determine which of the live ops should be provided to a user at a given point in time and/or in the game. This may be responsive to one or more trigger conditions being satisfied.

The server may be configured to provide client side support for the live op. For example the server may be configured to transmit game code, allowing the live op to be played, to the device associated with the player. The live op game code may be provided by a game code module or in any other suitable way. Alternatively, the server may be configured to transmit information to device associated with the player allowing the live op to be played or to be activated.

In some embodiments, the live op may be provided by a game module comprising associated computer code. The game module may be provided by and/or supported by the one or more processors and the one or more memories of the user device. The game code of the computer implemented game may be configured to cause the live op module to be loaded at a particular time. The module associated with the live op, when loaded, may be integrated as part of the game such that the user can play the live op. When the live op has ended, for example expired, the live op module may be uninstalled and removed from the game.

Figure 3:
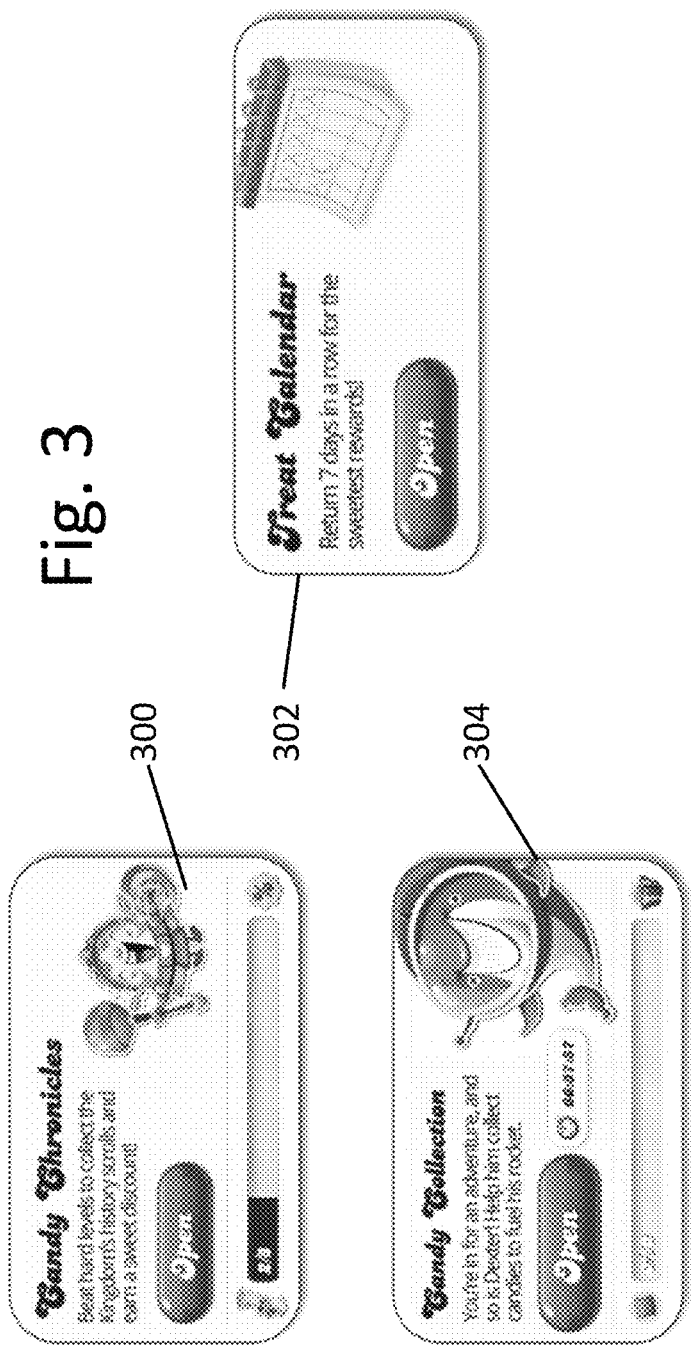
FIG. 3 shows an example of options which may be presented to a user of a computer implemented game.

Reference is made to FIG. 3 which shows some illustrative examples of live op options. As discussed, in some embodiments, at various points of a game, the user may be in presented with one of a plurality of different options. Purely by way of example only, FIG. 3 shows examples of different live op options.

In the first live op option 300, the user is presented with a first live op game. This sets the user with the task of completing certain-game levels to collect a game reward.

In the second live op 304, the user is presented with a second live op game. This sets the user with the task of collecting a certain number of game elements to collect a game reward.

In the third live op 302, the user is presented with a live op which simply requires the user to play the game on a consecutive number of days to collect a game reward.

It should be appreciated that when one of the live op options are presented to the user, the user may have the option of selecting or not the provided live op option. In some embodiments, a live op may be automatically run, without requiring user input.

The aim of providing these live op options may be to drive user engagement. Some embodiments may provide a computer implemented method to select one of the live op options, which is likely to be one which is of interest to an individual user.

It should be emphasised that although some example embodiments are in the context of so-called live op options, this is by way of example. Some embodiments may be used to select from any plurality of game options.

Some embodiments may aim to provide an option which drives user engagement of that individual user.

Some embodiments may aim to personalise an app specifically for that user.

It is a technical challenge to ensure that the game content is automatically generated to fit an individual user. Effective in-game personalization is a technical challenge when that game personalization is to be provided on an individual basis.

Another technical challenge is to provide effective in-game personalization for a particular individual on a real time basis.

Personalization of a game (or any other suitable app) is where the game exposes the user to a personalized experience. In other words, the personalization of a game to an individual player is provided by the computer code itself. This contrasts with customisation where players manually make changes based on their own preferences.

Some embodiments may use the game data generated by that user and/or other users to personalise the game to an individual user.

Figure 7:
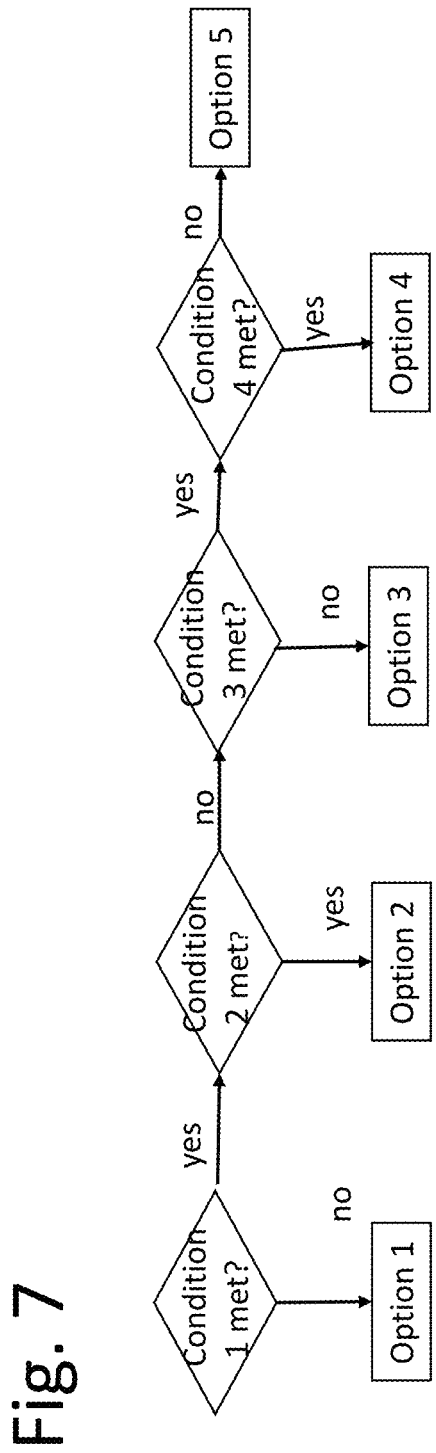
FIG. 7 shows an example of a heuristic method for selecting an option to be provided to the user.

Reference is made to FIG. 7. FIG. 7 shows an example of a heuristic method for selecting which one of five different options are to be presented to a user during the running of game code on the user device. This type of method is programmed into the game code.

Initially, a determination is made by the computer program as to whether or not a first condition, condition 1, is met. If not, a first option, option 1 is provided to the user by the game code and the method is ended.

If condition 1 is met, then it is determined by the computer program whether a second condition, condition 2 has been met. If so, a second option, option 2 is provided to the user by the game code and the method is ended.

If condition 2 is not met, it is then determined by the computer program whether a third condition, condition 3 has been met.

If condition 3 is not met, a third option, option 3 is provided to the user by the game code and the method is ended.

If condition 3 has been met, then it is determined by the computer program whether a fourth condition, condition 4, has been met. If so, a 4th option, option 4, is provided to the user by the game code and the method is ended.

If condition 4 is not met not, a fifth option, option 5 is provided to the user by the game code and the method is ended.

It should be appreciated that the example shown in FIG. 7 is purely for illustrative purposes and of course there may be more than five options or fewer than five options.

In some situations, a more complex heuristic method may be provided. For example, there may be more than one option at a given decision point. The option may be selected at random from the plurality of options or take into account which one or more options was previously presented to the user.

In some heuristic methods, the user may be presented with more than one option depending on the given one or more condition.

For a given condition, it is shown in this example that a particular option is provided, which may depend on whether or not that condition is met. In other embodiments, depending on whether a given condition is met or not, there may be a further stage of determining whether a further condition is met or not before any option is provided.

In some or more embodiments, a decision may be made that no option is to be presented to the user. This may be where the associated conditions have been met.

A heuristic policy may be provided for a given user which may be formulated as:

$$y=f_m(x;t)$$

where y is the decision on what option is to be provided to the player, x denotes the option that the player selected previously last time, t represents the time elapsed since the last option x was selected, and function $f_m$ is the defined heuristic policy. This may be one such as illustrated in FIG. 7.

With a heuristic methodology such as shown in FIG. 7 the features (i.e. x and t) may be simplified. This methodology may not be adaptable to the intrinsically rich and fine-grained individual player behaviours.

The creation and maintenance of reasonable rules embodied in the heuristic method such as shown in FIG. 7 generally requires empirical knowledge in the domain.

Machine learning may be applied in order to drive the selection of an option which is personal to an individual user. This may be based on rich player data. Machine learning may be applied so at cause an appropriate option to be presented to a user at a particular point in the game in order. That option should aim to be appropriate for that individual user. This may for example drive the user engagement of that user.

There are various different machine learning methodologies. One or more of the following machine learning methodologies may be used in some embodiments:

machine learning filtering methods such as content-based filtering and/or the like;

unsupervised clustering such as k-means clustering, KNN (k-nearest neighbours, DNN (deep neural network), GAN (generative adversarial network), and/or VAE (variational autoencoder)-based embedding/clustering approaches;

deep ranking;

deep reinforcement learning such as those method which use RL (reinforcement learning) algorithms (e.g. DQN (DeepMind's deep Q network), PPO (proximal policy optimization), and/or the like); and anomaly detection.

Some embodiments may for example use one or more machine learning methodologies.

Some embodiments may address or at least mitigate the so-called cold start issue. When new users start playing a game and/or or new game options are provided, it may be difficult to make good recommendations for that individual user due to lack of previously collected data. This may be exacerbated by policy bias which is discussed below.

Some embodiments may alternatively or additionally address or at least mitigate policy bias. This may occur where there is an attempt to provide personalization for an individual user after a somewhat acceptable solution is being used. This may lead to biases into the data, such as position bias and exposure bias. Without correcting or neutralizing those biases, the final recommendation result may be misleading.

Some embodiments may alternatively or additionally address or at least mitigate issues relating to randomized exploration. Randomized exploration requires each possible option to have a fair chance to be exposed to all users, in order to collect a dataset that contain a diversified user experiences and preferences to learn from. It may be difficult to collect the data in scenarios where a single option is being selected for a user so that the user is not selecting between different options. This may be challenging where it is an aim to avoid presenting a user with a randomly selected option.

Some embodiments may alternatively or additionally address or at least mitigate issues relating to data sparsity and imbalance. There may be scenarios where some options may be viable options but which for one reason or another may be selected infrequently by the user or presented to the user infrequently. For example, there may be an option which is regarded as being particularly desirable but which is to be provided to a user relatively infrequently. The data samples associated with this option may be relatively small leading a sparse training dataset associated with this option. This may contrast with other options for which a much larger data training set may be available. This data-imbalance may make some machine learning approaches difficult to be applied effectively. Some embodiments may address this.

Some embodiments may alternatively or additionally address or at least mitigate issues relating to feature space engineering. The information embedded in the input feature space determines the upper bound of the performance of the model. In some scenarios, there is a focus on obtaining an embedding space of the users and items (options) using a set of over-complete raw features (such as time series features), so that the recommendation problem may be greatly simplified later. However, this type of general-purposed embedding may be difficult to obtain without diversified fine-grained time-series data and/or careful maintenance/iteration of those embedding.

Some embodiments may alternatively or additionally address or at least mitigate issues relating to the requirement for manual (i.e. human) participation. For example a relatively large amount of manual work may be required to obtain a good recommendation core model. For example, insights and participation may be required from a human so as to adjust thresholds, health-checking and monitoring of a machine learning model and/or the like. Different approaches may require different amounts of manual effort. In some situations, the less user intervention that is required the better.

Some embodiments may alternatively or additionally address or at least mitigate issues relating to a feedback loop. The more a model impacts the current policy, the more likely and faster the model will become outdated to some extent, because the model itself is influencing the data that arrives into the system. To that end, it may be desirable to monitor and/or iterate the model automatically. It may be difficult to determine this feedback loop.

Some embodiments may alternatively or additionally address or at least mitigate issues relating to the multi-target problem. A multi-target problem is one which has more than one key performance indicator KPI or the like. Typically, the recommendation proposals focus on one target or KPI. However, some embodiments may aim to provide a multi-layered target where there may be more than one KPI target.

Some embodiments are configured to initially use a heuristically defined method, such as shown in FIG. 7, in the computer code to deal with the selection of one or more options in one or more circumstances. For example the heuristic method will be used to select an option when an option is newly added and/or when the amount of data available about a given user is relatively low, for example the user is a new player and/or the data associated with a given options is relatively old. This may avoid difficulties of the cold start problem associated with a machine learning approach.

Figure 12:
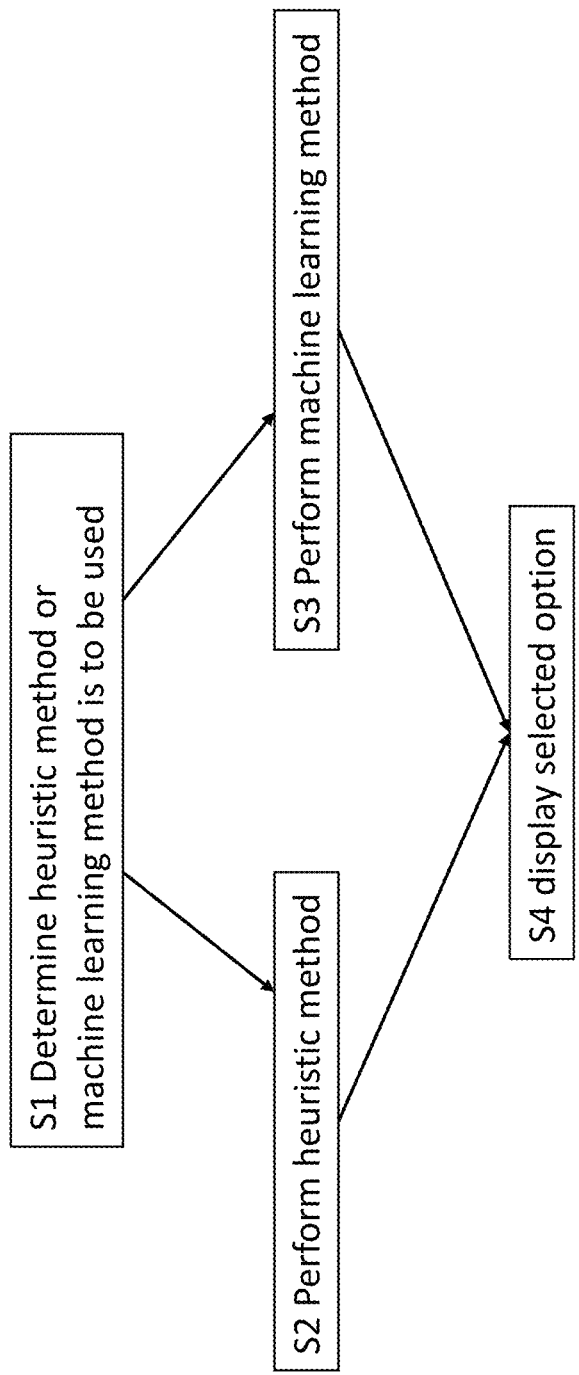
FIG. 12 shows a method of some embodiments.

Reference is made to FIG. 12 which shows a method of some embodiments. The method of FIG. 12 may be performed in the device of the user, in one or more game servers and/or by a combination of the device of the user and one or more game servers. The method may be performed by one or more processors in conjunction with one or more memories.

In S1, a determination is made as to whether a heuristic method is to be used or a machine learning method is to be used. This may be based one or more parameters such as: is the user a new player; how long has the user been using the app; has an option been added within a given time frame; how much data is there about the user; how much data is there for one or more options.

In some embodiments the heuristically defined method may be used when a player has never selected a given option when offered (this may be associated with a specific type of option in some embodiments) and/or when a player has selected a given option but not taken one or more given actions with respect to that option. There may be a time limit associated with the latter option in some embodiments.

If the heuristic method is to be used, then in step S2 the heuristic method is performed.

This is followed by step S4 where the selected option is caused to be displayed on the display of the user device. The user will then have the option of selecting or nor that displayed selected option.

If the machine learning method is to be used, then in step S3, the machine learning method is performed.

For the options for which the heuristic method is not used by the computer code, a machine learning policy or method will be applied. The machine learning policy may be used to recommend an option.

This is again followed by step S4 where the selected option is caused to be displayed on the display of the user device. The user will then have the option of selecting or nor that displayed selected option.

In some embodiments, the machine learning algorithm can learn when a heuristic method is to be performed and when a machine learning method is to be applied.

The machine learning policy may be defined as:

$$y=f_\theta\{g_\varphi(X_{agg});h_\omega(X_{ts})\}$$

where y is the decision on what option is to be provided to the player, $X_{agg}$ is a feature vector containing aggregated features, $X_{ts}$ is a matrix of time-series features, $g_\varphi$ and $h_\omega$ denote embedding functions parameterized by $\varphi$ and $\omega$ respectively, function $f_\theta$ is the recommendation function parameterized by $\theta$ and the notation ";" represents a combination operation. The learnt functions (i.e. $g_\varphi$, $h_\omega$ and $f_\theta$) may jointly optimize the multi-targets (for example a plurality of KPIs for a user) in this use case by personalizing a recommendation for an individual player.

Some embodiments provide a computer implemented selection process which uses both heuristic rules and ML models, such as shown in FIG. 12. Some embodiments may therefore be regarded as providing a hybrid approach.

In some embodiments, only a machine learning approach may be provided.

Figure 4:
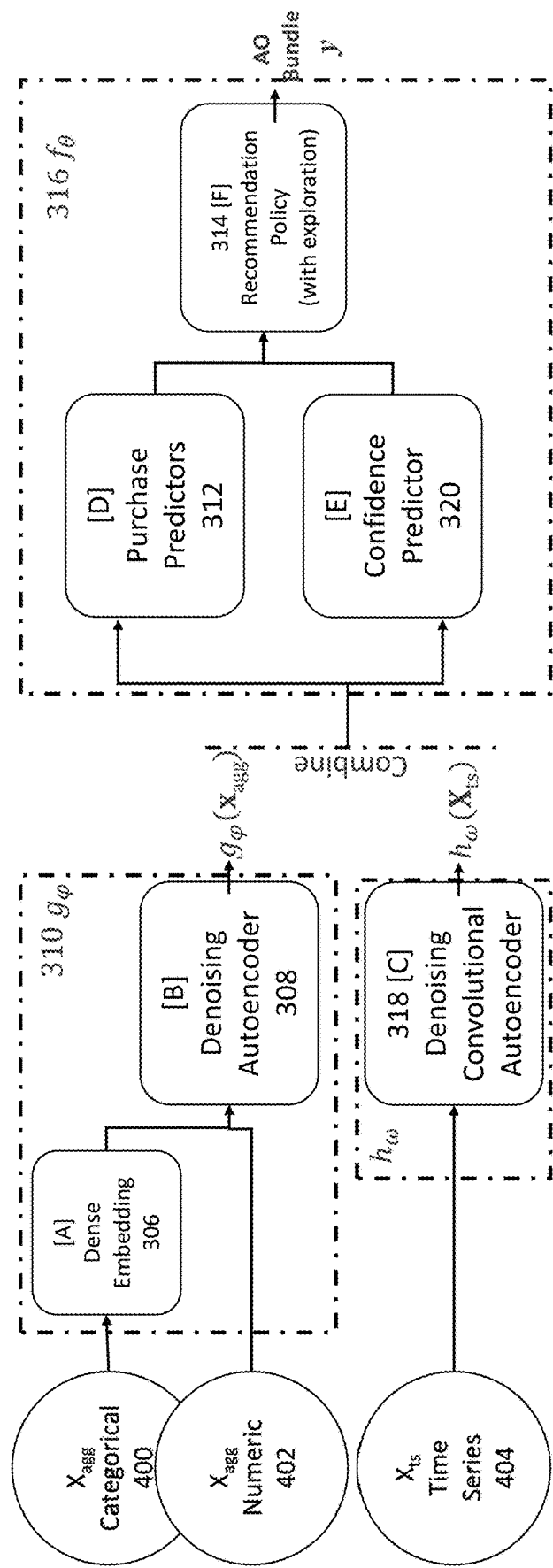
FIG. 4 shows an example of a computer implemented architecture of some embodiments.

Reference is made to FIG. 4 which schematically shows a model used in some embodiments. It should be appreciated that the model shown in FIG. 4 is a computer implemented model. The computer implemented model is run on any suitable hardware. The hardware may comprise one or more processors and/or one or more memories. The hardware may comprise one or more CPUs (computer processing units), GPUs (graphics processing units), FPGAs (field programmable gate arrays), ASICs (application specific integrated circuits) and/or any other suitable hardware.

In some embodiments, the model uses the following features:

$X_{agg}$ aggregated categorical features (referenced 400 in FIG. 4);

$X_{agg}$ aggregated numeric features (referenced 402 in FIG. 4); and $X_{ts}$ is a matrix of time-series features (referenced 404 in FIG. 4).

The features may be regarded as the input data. The specific data which is collected and how it is managed to provide an input may be dependent on the app to which an embodiment is being applied.

In some embodiments, the data which is input is data which has been collected for the particular user.

$X_{agg}$ aggregated categorical features may comprise any suitable features. By way of example only, these features may comprise one or more of: country; client platform; device language; device manufacturer; device time zone; information indicating if the device is an android device; information indicating if the device is an iOS device; operating system information; communication protocol information; and/or the like.

$X_{agg}$ aggregated numeric features may comprise any suitable features. By way of example only, these features may comprise one or more of: number of sign-ins; days since first activity; number of transactions in a given period of time; number of messages clicked on in a given period of time; number of messages processed in a given period of time; number of messages sent in a given period of time; number of rounds played in a given period of time; number of rounds won in a given period of time; number of failed attempts at a current level; and/or the like.

$X_{ts}$ may be defined in terms of buckets of activity: This is where data is collected for a given time period or session. By way of example only, this may be one or more of: the number of game starts is in a given period of time or session; the number of moves made in a given period of time or session; the number of rewards collected in a given period of time or session; the number of times a user has successfully played a game in a given period of time or session; the number of times a user has failed when playing a game in a given period of time or session; a number of times a particular game element has been used in a given period of time or session; and/or the like.

In some embodiments, a script is configured to collect at least some of the above data. The script may take into account a trigger condition which makes a user eligible to be shown one of a plurality of different options. The script may collect observed facts. This may be for example a player profile and/or activity prior to a trigger. This may for example be $X_{agg}$ and/or $X_{ts}$. The script may collect data indicating if the option has been selected by the user. This may be "y". This may indicate if the option has been selected by the user within a time frame associated with that option. In some embodiments, the option may be available to the user for a given period of time.

To address the feature engineering challenge, a relatively large number of raw features may be used. This may allow the computation (for example pre-processing and/or transformation) of training features and serving features to be the same. This may allow more flexibility in controlling the granularity and format (e.g. time-series and aggregation) of the features.

The model shown in FIG. 4 is an end-to-end (in both training and serving) deep model compound. The model shown in FIG. 4 aims to implement the equation:

$$y = f_\theta \{ g_\varphi(X_{agg}); h_\omega(X_{ts}) \}$$

This model aims to produce a recommendation y (one of the options) using features (i.e. $X_{agg}$ and $X_{ts}$) as the input using the trainable functions $f_\theta$, $g_\varphi$ and $h_\omega$. In FIG. 4, the components of the model with learnable weights or adjustable parameters are referenced A to E.

The learnt functions $f_\theta$, $g_\varphi$, and $h_\omega$ may allow the optimization of a plurality of KPIs (multi-targets) for an individual user.

The components A to E are trained in an end-to-end manner jointly. In some embodiments, this may provide improved results. This may be a result of more domain knowledge being encoded into the embedding form at an early stage and adapted all the way until convergence.

However, different embodiments, a different training methodology may provide suitable results.

In other embodiments, one or more the following may alternatively or additionally provided for the training of the model:

pre-train components A to C first, then train components D and E whilst not changing the weights of components A to C; or pre-train components A to C first, then train components A to E together.

Different ones of these options may be better suited to different scenarios and different apps.

Component A is referenced 306 and is a dense embedding component. This component translates the categorical features $X_{agg}$ into dense vectors with the aim to preserve the relative information related to the specific domain task being solved. Component A may be implemented in any suitable way and may provide a matrix multiplication function.

Component B is referenced 308 and is a de-noising auto-encoder component. This component receives the output of component A and the numeric features $X_{agg}$. The component provides a representation $g_\varphi(X_{agg})$ for the aggregated input features where $X_{agg}$ is a concatenation of both numerical features and embedded categorical features. In some embodiments, the added noise may follow a zero-mean Gaussian with for example a standard deviation of 1 $e^{-12}$. The de-noising architecture may have a neural network input layer and a neural network output layer. One or more neural layers may be provided between the input layer and the output layers. In some embodiments, the number of layers may be an odd number of layers. The layers may be symmetrically arranged around a central layer. For example, in the case of a 3 layer arrangement, the input layer may have k neurons or nodes, the output layer may have k neurons or nodes and the middle layer may have l neurons or nodes. This means that the obtained embedding has a dimension of l. The value of l may be less than the value of k.

Component B may be implemented in any suitable way. For example, in some embodiments, component B may be provided by an unsupervised deep learning function.

Component C is referenced 318 and is a de-noising convolutional auto-encoder. This component aims to get a robust representation, $h_\omega(X_{ts})$ for the time-series input features $X_{ts}$. This component may perform a similar task to the de-noising auto-encoder except that the connections between layers may be convolution operations instead of full-connections. The added noise may follow a zero-mean Gaussian with for example a standard deviation of 1 $e^{-8}$. There may be n time-series feature in total, and each has m data points representing m time periods. The $X_{ts}$ matrix is n×m. By way of example only the time periods may be days. In one embodiment, n may be 6 and m may be 30. The size of the matrix may be dependent on the data available. Different embodiments may use different sizes of matrix.

Component C may be implemented in any suitable way. For example, in some embodiments, component C may be provided by an unsupervised deep learning function.

In some embodiments, there is no requirement to capture correlations between different time-series features. In some embodiments, a one-dimensional convolution/de-convolution operation is applied. The component C may have any suitable embedding size. In some embodiments, the embedding size may be smaller than the value of n×m.

Figure 9:
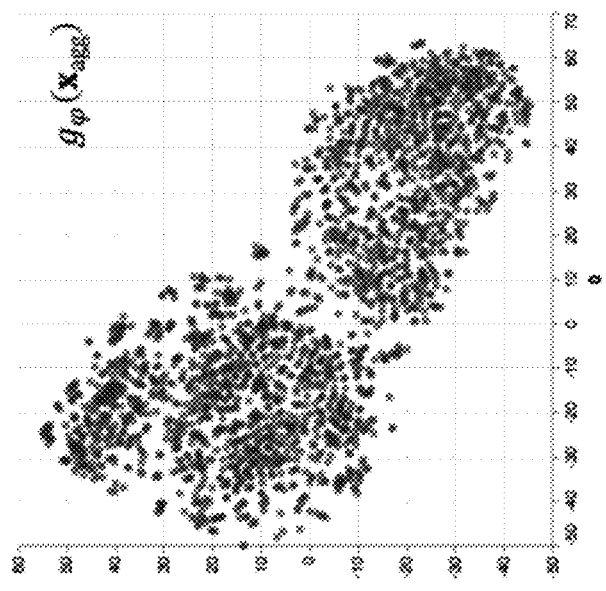
FIG. 9 shows a visual representation of learned encoding used for aggregated features.
Figure 8:
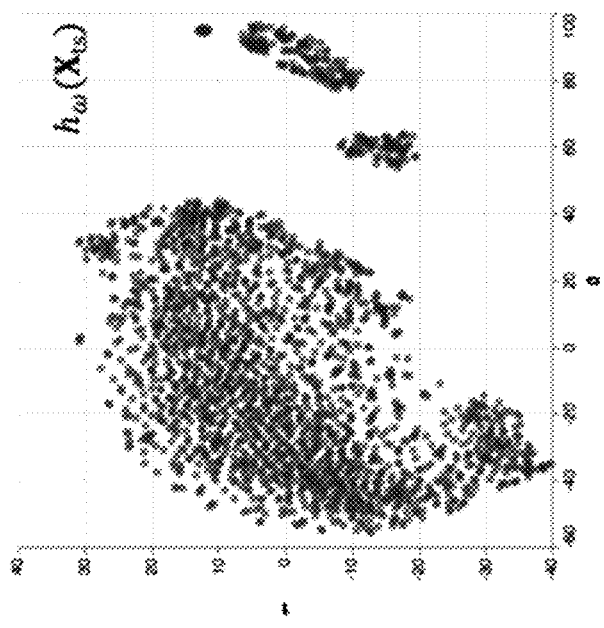
FIG. 8 shows a visual representation of learned encoding used for time-series features.

In this regard reference is made to FIGS. 8 and 9. FIGS. 8 and 9 show visualized t-SNE. t-SNE is an algorithm for dimensionality reduction that is well-suited to visualizing high-dimensional data. It allows the data to be visualized and may be optional in some embodiments. The name stands for t-distributed Stochastic Neighbor Embedding. The algorithm aims to embed high-dimensional points in low dimensions in a way that respects similarities between points. This algorithm may be used to visualize the data processing provided by components B and C. FIG. 8 shows the visualized t-SNE for component B and FIG. 9 shows the visualized t-SNE for component C. This is a data exploration and visualization technique.

Components B and C aim to simplify the feature space.

In some embodiments, the components B and/or C may alternatively comprise one or more attention models in some embodiments. Attention models, or attention mechanisms, are input processing techniques for neural networks that allows the network to focus on specific aspects of a complex input until the entire dataset is categorized. The attention model approach breaks down complicated tasks into smaller areas of attention that are processed sequentially.

The outputs of components B and C are provided as inputs to each of components D and E.

Component D is referenced 312 and is an option predictor. Component D receives the concatenated embedding/encoding from both components B and C and predicts the probability for each candidate option. In this example, the probability may be that the particular option is selected when presented to the user.

Figure 5:
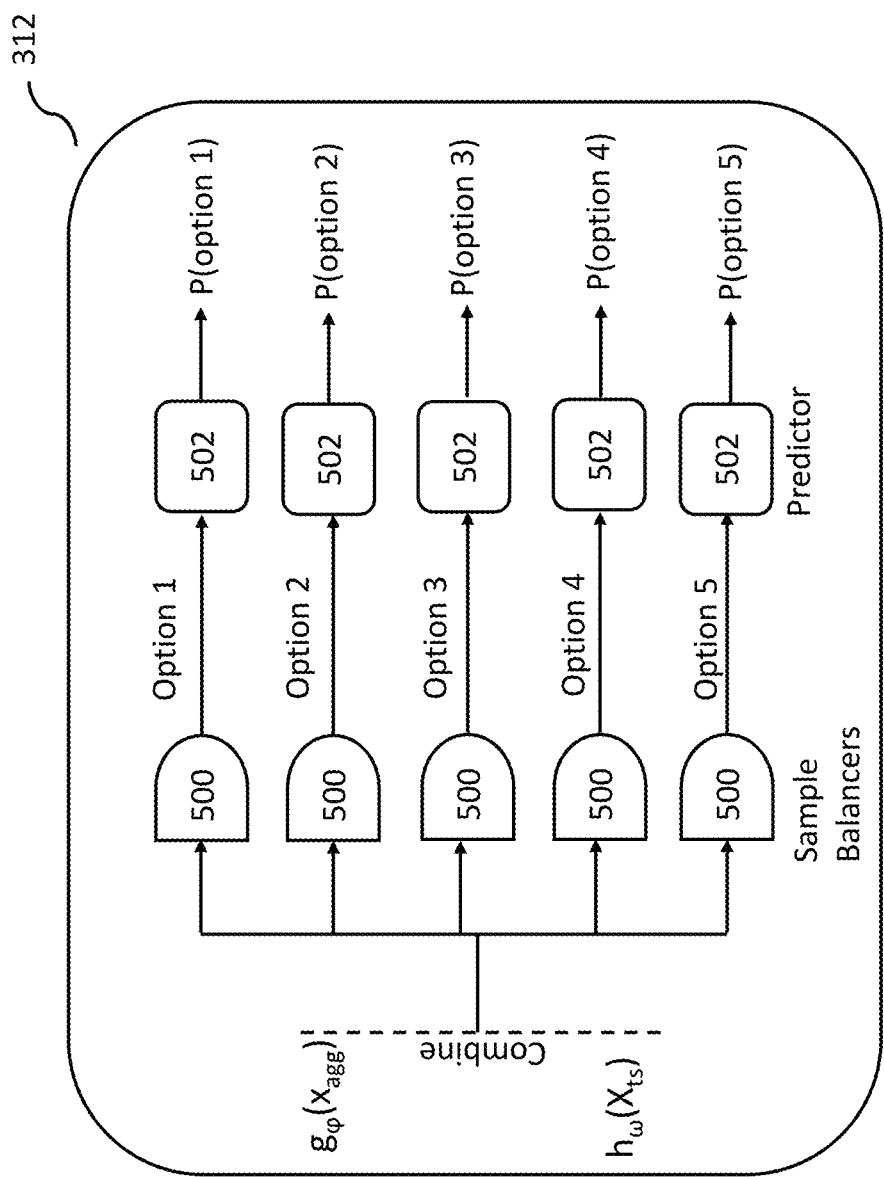
FIG. 5 shows the option predictor component of FIG. 4 in more detail.

Reference is made to FIG. 5 which shows component D in more detail.

For each of the possible options (options 1 to 5 in this example) a sample balancer 500 is provided.

Each sample balancer 500 provides an output to a respective predictor 502 for that option. The output provided by a respective predictor 502 provides a probability that that option will be selected.

It is appreciated that for some players it may be a challenge to predict accurately the probability for one or more options. However, in practice players with similar behaviours (embedded in the features) may be provided different options, and then this knowledge can be transferred to other similar players. It should be appreciated that each option has its own multi-layer NN (neural network) sub-module as a probability predictor, so that the complexity of each NN can be customized to the available data volume to prevent over-fitting.

In some embodiments, the sample balancer provided for each option may address the data sparsity and/or imbalance challenges discussed previously. The sample balancer may be used where the number of positive samples for a given option is lower, for example significantly lower than the number of negative samples. (Where the option is presented and selected that is positive sample and where the option is presented and not selected, that is a negative sample. The sample balancer may alternatively or additionally be used where there is only a small amount of data associated with a given option.

By training with the sample balancer, this can avoid bias towards the option with the highest number of samples.

The sample balancer is provided before each predictor 502. The sample balancer may perform sample balancing within each mini-batch of data used for optimization. In some embodiments the target ratio between the positive and negative samples can be tuned during the training. For example if there are 10 positive samples associated with 100 samples, 10 negative samples will be selected at random by the sample balancer. In this example, the sample balancer uses equal number of positive samples and negative samples. In other embodiments, a different ratio may be used such as 60:40 or 70:30 or any other suitable ratio.

In some embodiments, different sample balancers may use different ratios.

In some embodiments, the sample balancing may weight all the positive samples and all the negative samples so that the weight of the positive and negative samples satisfy a required ratio. For example if there are N negative samples and P positive samples which are to be equally weighted then, the positive samples are weighted by ½P and the negative samples by ½N.

In some embodiments, where there are only negative samples, one or more positive samples may be provided.

In some embodiments, each predictor module may be regarded as a binary classifier. The output probability for each option Poption1 and so on is the output (for the positive case). A softmax operation or function may be used to normalize the input data into a probability distribution such that the output value is between 0 and 1. The probability of the negative case is 1-Poption1. Some embodiments may alternatively or additionally make use of the probability of the negative case.

Figure 6:
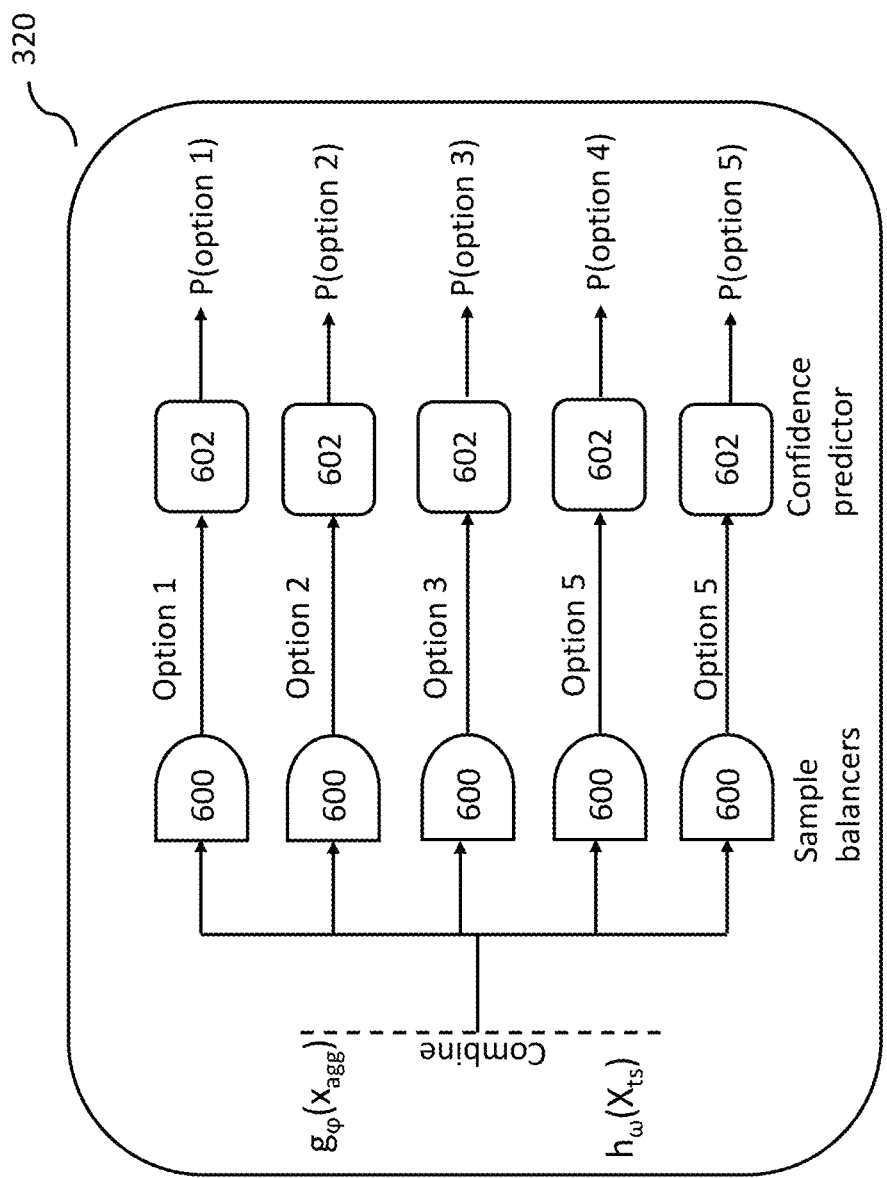
FIG. 6 shows the confidence predictor component of FIG. 4 in more detail.

Component E is referenced 320 and is a confidence predictor. This component is shown in FIG. 6 in more detail. As with component D, a sample balancer 600 is provided for each option.

A NN submodule 602 providing the confidence prediction is provided for each sub option.

As discussed previously, module D provides a probability for each option of the likelihood of that option being selected if presented to the user. However, as previously noted, there may be policy bias challenges where trust of each probability number may not be the same since not all options may have had an equal chance of being exposed to each player. For example, where an option has been presented to a given player, the trust for the probability may be greater as compared to the case where the option has not been presented to the player previously. To this end module E is provided to predict a confidence in the probability associated with each option which is generated by module D. Component E may be configured to predict how likely the corresponding option was exposed to the player. In other words this is the probability that a particular option has been seen by a particular player or user.

In some embodiments, the labels for training this module may simply be the options exposed to the player. This may be regarded as mini-batch training so there is a fair chance that all options will have their exposure in the mini-batch. This may allow the selection of samples for each classification head in module E. The sample balancer is used here because the ratio of each option in a mini-batch may be imbalanced.

In some embodiments, gradient back-propagation may be stopped from component E to the encoders to avoid sabotaging the learned encoding from reconstruction error ((MSE (mean squared error) from modules B and C). In some embodiments, modules A, B and C are first tuned. Thus the neural network weights may be learnt for the modules A to C first. Once these modules are tuned, then modules D and E are tuned. The neural network weights for modules D and E may then be learnt.

Component F is a recommendation component and is referenced 314 in FIG. 4. This may be provided by a machine learning module and/or may be provided by a module which performs one or more algorithms. Component F is configured to provide a final recommendation based on the outputs from components D and E for each of the options. In some embodiments, there may be a need to adjust the threshold used to distinguish the selection of an option versus the non selection option according the respective output of module D. This is because it is desirable in some embodiments to have both high precision and high recall. Precision can be seen as a measure of exactness or quality, whereas recall is a measure of completeness or quantity. High precision means that an algorithm returned substantially more relevant results than irrelevant ones, while high recall means that an algorithm returned most of the relevant results.

Figure 10:
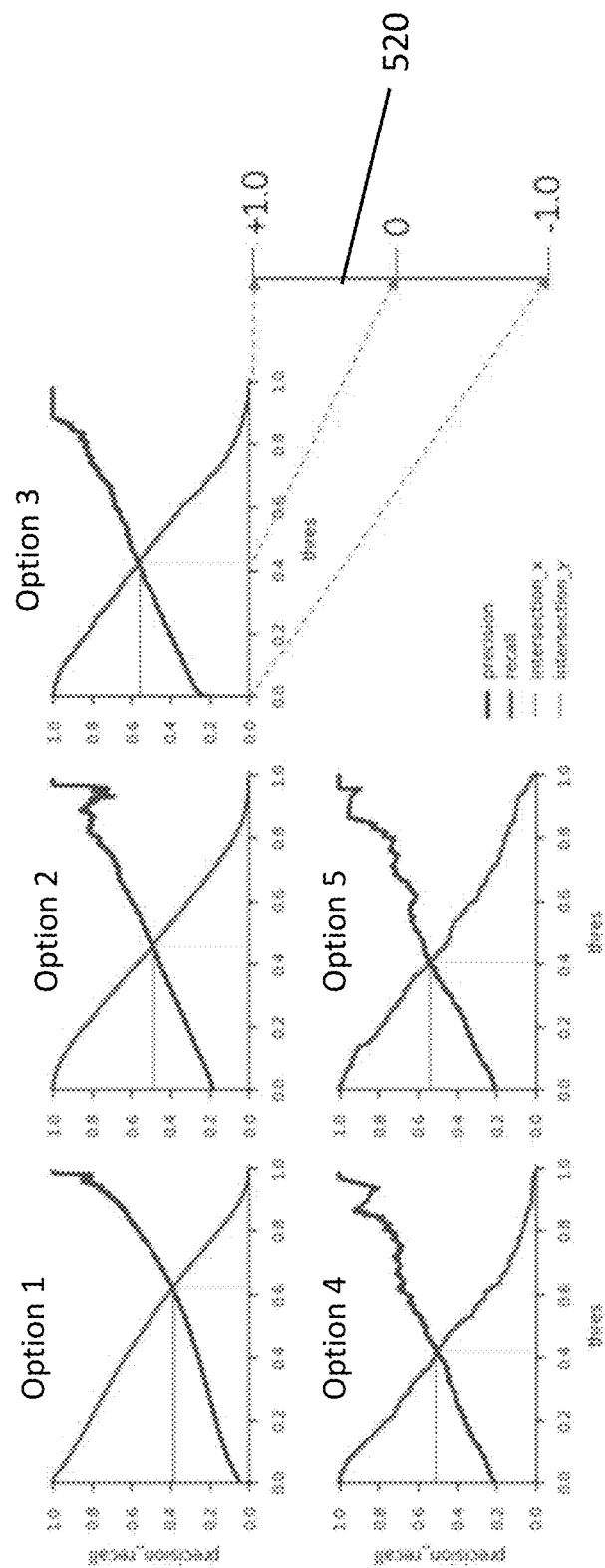
FIG. 10 graphically shows adjustment of thresholds for probability of selection outputs.

Reference is made to FIG. 10 which shows precision-recall curves for each of the different options provided by component D.

For each option, a precision-recall curve may be used. A precision-recall curve (PRC) is a plot of the precision and the recall (y-axis) against the threshold (x-axis). The recall curve has a downwards or negative gradient and the precision curve has the upwards or positive gradient.

A PRC is plotted for each option using the prediction output on the hold-out test dataset. The intersection points of the recall and precision curve are found and then used to determine the adjusted threshold. This intersection can be determined algorithmically in some embodiments. It is worth noting that the corresponding selection probability p for a given option (the output for module D), has to be re-scaled using the new thresholds, resulting in a new selection probability noted as $p'_i$. As noted by the scale 520, the threshold of the intersection may be "0" with values above this threshold being scaled to between "0" and "1" and values below this threshold being scaled to between "0" and "−1".

Figure 11:
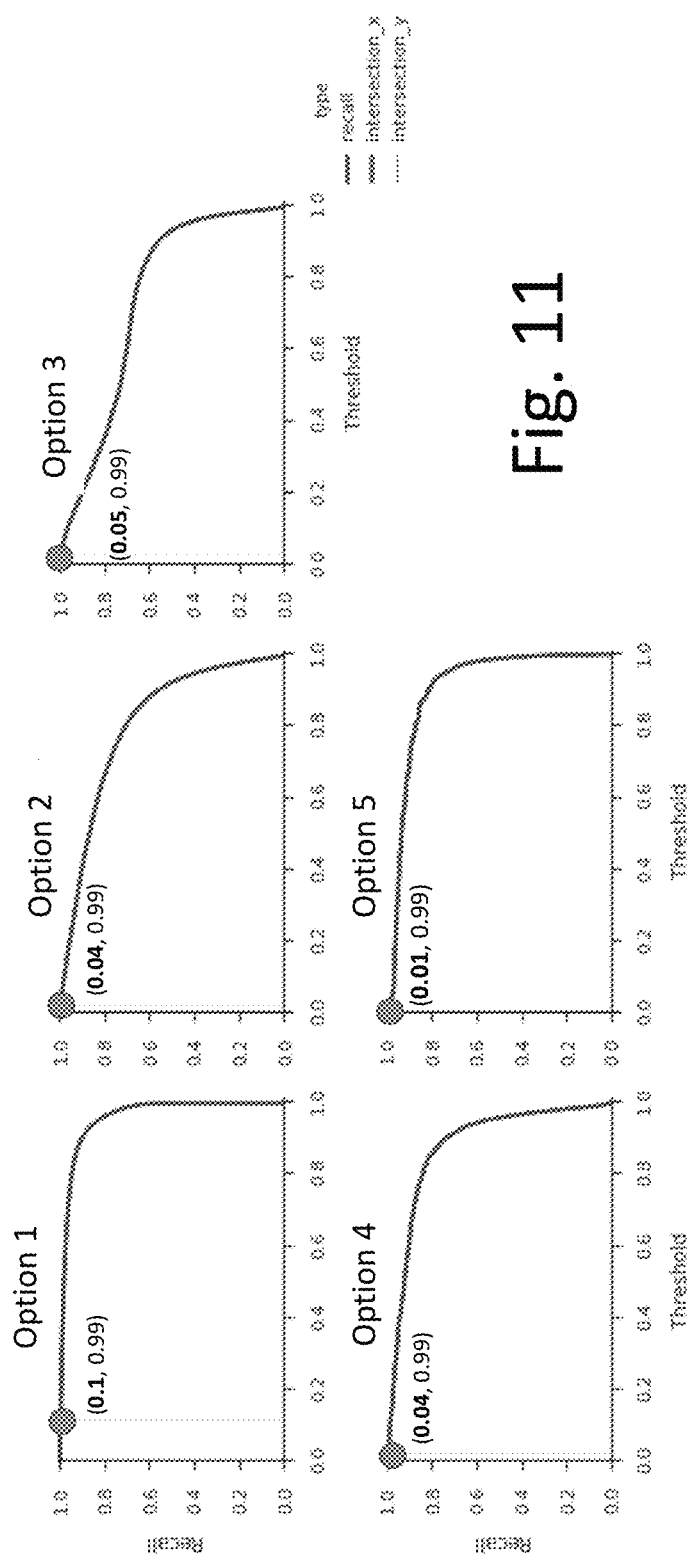
FIG. 11 graphically shows adjustment of thresholds for confidence of probability outputs.

In some embodiments, the confidence prediction provided by module E may also be adjusted. In some embodiments, the confidence prediction is used as a filter for the option selection prediction provided by module E. The confidence prediction may be adjusted to avoid constantly selecting from too few options. In some embodiments, a higher recall on the hold-out test dataset is obtained. As is shown in FIG. 11, for each option, a recall curve may be used is also plotted for the confidence output of module E. The recall curve has a downwards or negative gradient.

The target recall maybe set to a relatively large value such as for example, 0.99 and the corresponding thresholds are determined from the x-axis accordingly. FIG. 11 shows the threshold as being 0.1 for option 1, 0.04 for option 2, 0.05 for option 3, 0.04 for option 4 and 0.01 for option 5. Recall is the number of items correctly identified as true positives out of a total true positives. The way in which the confidence probabilities are adjusted may be the same as the selection probabilities. That is, the intersection of the precision and recall curves may be used to provide an adjusted threshold. The adjusted threshold may be used to provide an adjusted confidence probabilities. The adjusted confidence probabilities may be denoted $c'_i$.

It should be appreciated that one or more algorithms may be performed to determine the adjusted confidence and/or selection probabilities, without requiring the "plotting" of the graphs.

In some embodiments, the final recommendation value y output by component F may use ε-greedy and/or Thompson sampling. For example, where ε=0.5, this means that half of the outputs y of the recommendation value will be a random selection of one of the options and half of the outputs of the recommendation value will be based on the machine learning.

The value of ε is used to control the proportion of the recommendations which are based on the machine learning model and the proportion of recommendations which are selected at random.

It should be appreciated that the value of ε may be controlled to be any suitable value for the particular application. In some embodiments, the value may decrease over time. For example, the value of c may reduce over time to say around 0.1 or 0.05 so that most recommendations are based on machine learning. The smaller proportion of the recommendations which are based on a random selection may continue to allow exploration of the data set to provide additional data which can be used to train the model.

In some embodiments c may even decrease to zero.

It should be appreciated that any other method which addresses the so called exploration-exploitation dilemma can be used in addition or alternatively to the ε-greedy and/or Thompson sampling.

In some embodiments, the adding of randomness/exploration via c-greedy and/or Thompson sampling allows for the collecting of more randomized data to iterate the model. This may help resolve the randomized exploration challenge.

In some embodiments a value may be associated with an option which is denoted as $v_i$. The final value associated with an option for a particular user is $u_i = p'_i \cdot c'_i \cdot f(v_i)$. For example, $f(v_i)$ may be $\log_{10}(v_i)$. The notation i denotes the various options available and corresponds for example to each option branch in FIGS. 5 and 6.

The $v_i$ should be further normalized across all options, producing $\bar{u}_i \in \Omega$.

In some embodiments, the recommendation component may in some circumstances recommend the use of the heuristic method. For example, the recommendation component may recommend the use of the heuristic method if the prediction confidence is below a certain value. This may be part of the machine learning model.

It should be appreciated that in some embodiments only one set of features may be used as inputs to the model of FIG. 4. A set of features may be treated in the same way by the model. In some embodiments, two or more sets of data may be treated in the same way by the model. In some embodiments, two or more sets of data may be treated in different ways by the model. In some embodiments, there may be two or more sets of features. In some embodiments, the number of sets of features may be dependent on available data.

The sets of features described in relation to FIG. 4 are by way of example only and different embodiments may use one or more other sets of features.

In some embodiments, the model may be adapted during use to include additional set of features as that data becomes available. The model may be adapted to use the data associated with the additional features.

In some embodiments, where there is only one set of features, the equation may be simplified:

$$y = f_\theta \{g_\varphi(X)\}$$

where y is the decision on what option is to be provided to the player, X is a feature vector containing the relevant features, $g_\varphi$ denotes an embedding functions parameterized by $\varphi$ and function $f_\theta$ is the recommendation function parameterized by $\theta$.

Where there is more than one set of features, the equation may be modified to reflect the use of additional sets of features.

Figure 13:
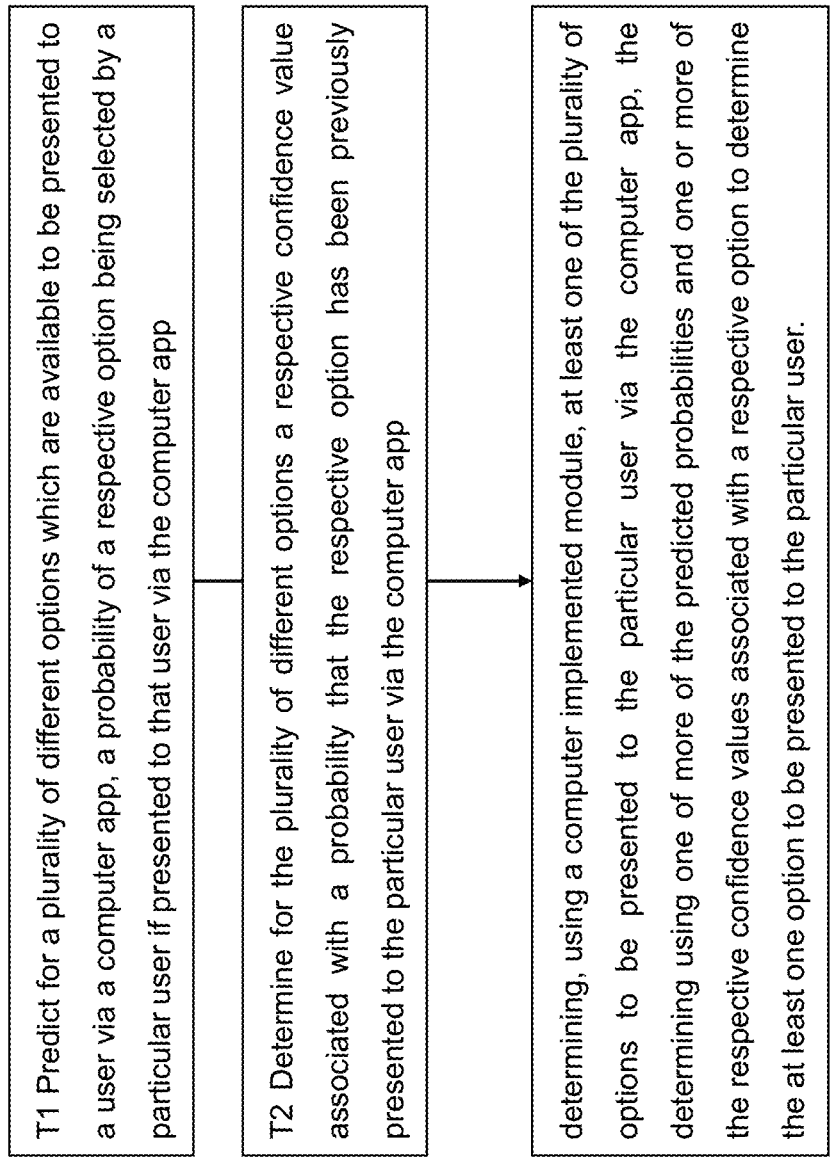
FIG. 13 show another method of some embodiments.

Reference is made to FIG. 13 which shows a method of some embodiments.

In step T1, the method comprises predicting, using a first machine learning module, for a plurality of different options which are available to be presented to a user via a computer app, a probability of a respective option being selected by a particular user if presented to that user via the computer app.

In step T2, the method comprises determining, using a second machine learning module, for the plurality of different options a respective confidence value associated with a probability that the respective option has been previously presented to the particular user via the computer app.

In step T3, the method comprises determining, using a computer implemented module, at least one of the plurality of options to be presented to the particular user via the computer app, the determining using one of more of the predicted probabilities and one or more of the respective confidence values associated with a respective option to determine the at least one option to be presented to the particular user.

In some embodiments, all or a part the model may be implemented by one or more servers. The model may for example as shows in FIG. 4.

In some embodiments, all or a part of the model may implemented by one or more computer devices.

In some embodiments the model may be implemented by a computer system. The computer system may comprise one or more servers. Alternatively or additionally, the computer system may comprise one or more user devices.

In some embodiments, modules A to C may be implemented by one or more servers. Modules D to F may be implemented by a user device.

In some embodiments, modules A to E may be implemented by one or more servers. Module F may be implemented by a user device.

In some embodiments, some of the functionality of a given module may be provided by one or more servers and part of the functionality of the given module may be provided by a user device. By way of example only, part of module F may be provided by a server and part by a user device. The recommendation of a particular option may for example be provided by the server and the exploration may be provided by a user device.

In some embodiments, where all of the modules of FIG. 4 are provided by one or more servers or one or more network devices, the server or network device may be configured to cause a message to be transmitted to the user device with information about the recommended one or more options.

It should be appreciated that a server has been given as one example of a network side device which is able to provide one or more embodiments. It should be appreciated that this is by way of example only and different embodiments may be alternatively or additionally provided by any other suitable network device or devices.

It should be appreciated that one or more embodiments may be provided by a "cloud" arrangement.

Some embodiments have one or more module. A module may be provided by one or more of hardware and software. In some embodiments, the hardware and/or software providing at least a part of one module may provide at least a part of one or more other modules.

The hardware providing one or more modules may comprise at least one processor and at least one memory. The hardware providing one or more modules may comprise machine learning hardware.

In some embodiments, a player of a computer implemented game may receive one or more "tokens" when a particular type of game level is completed. This may be for example, a harder level which typically would require more attempts to complete than an easier level. When a given number of tokens have been collected, they will be provided with one of a plurality of different options. The option which is presented to the user is selected using a method such as previously described. There may be a time limit associated with the option. At the end of the time limit, the number of tokens may be reset, for example to zero. In some embodiments, at the expiry of the time limit, a method such as previously described may be used to select an option. This may be the same or different at the previous option. This latter option may be associated with a time limit and at the end of the time limit, if the latter option is not selected, the number of tokens may be reset, for example to zero.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, and/or CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A computer system comprising:
   a first machine learning module configured to predict for a plurality of different game options which are available to be presented to a user via a computer app providing a computer implemented game, a probability of a respective option being selected by a particular user if presented to that user via the computer app;
   a second machine learning module configured to determine for the plurality of different game options a respective confidence value associated with a probability that the respective option has been previously presented to the particular user via the computer app providing the computer implemented game; and
   a computer implemented module configured to determine at least one of the plurality of game options to be presented to the particular user via the computer app providing the computer implemented game, the computer implemented module being configured to either:
   select one of the game options at random to be presented to the particular user; or
   determining using one of more of the predicted probabilities and one or more of the respective confidence values associated with a respective game option to determine the at least one game option to be presented to the particular user as a machine learning selected option,
   wherein the computer implemented module is configured to control a proportion of game options selected at random and a proportion of game options selected using machine learning to be fixed proportions.

2. The computer system as claimed in claim 1, wherein the first machine learning module is configured to perform a sample balancing for at least one game option to adjust a ratio of positive samples to negative samples for that game option, and to use the adjusted positive and negative samples for that option to determine the probability for that game option.

3. The computer system as claimed in claim 2, wherein the first machine learning module is configured to perform a sample balancing for each of the game options.

4. The computer system as claimed in claim 1, wherein the second machine learning module is configured to perform sample balancing for at least one game option to adjust a ratio of samples of a respective game option with respect to the samples of at least one other game option and to use those adjusted samples to determine the confidence value for the respective game option.

5. The computer implemented system as claimed in claim 4, wherein the second machine learning module is configured to perform sample balancing for each of the game options.

6. The computer system as claimed in claim 1, wherein the computer implemented module is configured to determine if one or more, but not all of the selected ones of the plurality of options to be presented to the particular user via the computer app is to be selected based on a heuristic method instead of being selected by machine learning.

7. The computer system as claimed in claim 6, wherein the computer implemented module is configured to determine that at least one of:
one or more of the predicted probabilities; and/or
one or more of the respective confidence values,
is below one or more thresholds and use the heuristic method to select the one or more of the plurality of game options to be presented to the particular user via the computer app of the computer implemented game.

8. The computer system as claimed in claim 6, wherein the computer implemented module is configured to determine based on amount of available data for one or more options that a heuristic method is to be used to select the one or more of the plurality of game options to be presented to the particular user via the computer app.

9. The computer system as claimed in claim 1, wherein the computer implemented module is configured to adjust a probability of one or more game options based on a respective threshold value for that respective game option determined using precision-recall information.

10. The computer system as claimed in claim 1, wherein the computer implemented module is configured to adjust a confidence value for one or more game options based on a respective threshold value for that respective game option determined using recall information.

11. The computer system as claimed in claim 1, comprising a processing module configured to process one or more categorical data, numeric data and time series data to provide an output, the output being provided as an input to one or more of the first and second machine learning modules.

12. The computer system as claimed in claim 11, wherein the processing module comprises a third machine learning module, the third machine learning module configured to receive the time series data information and to perform convolutional encoding.

13. The computer system as claimed in claim 11, wherein the processing module comprises a fourth machine learning module, the fourth machine learning module configured to receive one or more of categorical data information and numeric data information and to perform denoising encoding.

14. The computer system as claimed in claim 1, wherein the fixed proportions are controlled by a value.

15. The computer system as claimed in claim 1, wherein the fixed proportions are updated to decrease the proportion of game options selected over time.

16. A computer implemented method comprising:
predicting, using a first machine learning module, for a plurality of different game options which are available to be presented to a user via a computer app providing a computer implemented game, a probability of a respective game option being selected by a particular user if presented to that user via the computer app providing the computer implemented game;
determining, using a second machine learning module, for the plurality of different game options a respective confidence value associated with a probability that the respective game option has been previously presented to the particular user via the computer app providing the computer implemented game; and
determining, using a computer implemented module, at least one of the plurality of game options to be presented to the particular user via the computer app providing the computer implemented game, the determining comprising selecting one of the game options at random to be presented to the particular user or determining using one of more of the predicted probabilities and one or more of the respective confidence values associated with a respective game option to determine the at least one game option to be presented to the particular user as a machine learning selected option,
wherein the proportion of game options selected at random and a proportion of game options selected using machine learning are fixed proportions.

17. The computer implemented method as claimed in claim 16, wherein the predicting, using the first machine learning module, comprises performing a sample balancing for at least one game option to adjust a ratio of positive samples to negative samples for that game option, and using, by the first machine learning module, the adjusted positive and negative samples for that game option to determine the probability for that game option.

18. The computer implemented method as claimed in claim 16, wherein the determining, using the second machine learning module, comprises performing sample balancing for at least one game option to adjust a ratio of samples of a respective game option with respect to the samples of at least one other game option and using, by the second machine learning module, those adjusted samples to determine the confidence value for the respective game option.

19. The computer implemented method as claimed in claim 16, wherein the selecting, using the computer implemented module, comprises determining if one or more, but not all of the selected one of the plurality of game options to be presented to the particular user via the computer app is to be selected based on a heuristic method instead of being selected by machine learning.

20. The computer implemented method as claimed in claim 19, wherein the selecting, using the computer implemented module, comprises determining that at least one of:
one or more of the predicted probabilities; and/or
one or more of the respective confidence values,
is below one or more thresholds and using by the computer implemented module the heuristic method to select the one or more of the plurality of game options to be presented to the particular user via the computer app of the computer implemented game.

21. The computer implemented method as claimed in claim 16, wherein the selecting, using the computer implemented module, comprises determining based on amount of available data that a heuristic method is to be used to select the one or more of the plurality of game options to be presented to the particular user via the computer app.

22. The computer implemented method as claimed in claim 16, wherein the selecting comprises adjusting a probability for at least one game option based on a respective threshold value for that respective game option determined using precision and recall information.

23. The computer implemented method as claimed in claim 16, wherein the selecting comprises adjusting a confidence value for at least one game option based on a respective threshold value for that respective game option determined using recall information.

24. A non-transitory computer program product, said computer program product comprising computer executable code which when run is configured to:
predict, using a first machine learning module, for a plurality of different game options which are available to be presented to a user via a computer app providing a computer implemented game, a probability of a respective game option being selected by a particular user if presented to that user via the computer app providing the computer implemented game;
determine, using a second machine learning module, for the plurality of different game options a respective confidence value associated with a probability that the respective game option has been previously presented to the particular user via the computer app providing the computer implemented game; and
determine, using a computer implemented module, at least one of the plurality of game options to be presented to the particular user via the computer app of the computer implemented game, the determining comprising selecting one of the game options at random to be presented to the particular user or determining using one of more of the predicted probabilities and one or more of the respective confidence values associated with a respective game option to determine the at least one game option to be presented to the particular user,
wherein the proportion of game options selected at random and the proportion of game options selected using one or more of the predicted probabilities and one or more of the respective confidence values associated with a respective game option are fixed proportions.

* * * * *